(12) United States Patent
Knapp et al.

(10) Patent No.: US 8,237,603 B2
(45) Date of Patent: Aug. 7, 2012

(54) RECEIVER TEST CIRCUITS, SYSTEMS AND METHODS

(75) Inventors: Herbert Knapp, Munich (DE); Erich Kolmhofer, Linz (AT)

(73) Assignee: Infineon Technologies AG, Neubiberg (DE)

( * ) Notice: Subject to any disclaimer, the term of this patent is extended or adjusted under 35 U.S.C. 154(b) by 295 days.

(21) Appl. No.: 12/696,220

(22) Filed: Jan. 29, 2010

(65) Prior Publication Data

US 2011/0187587 A1     Aug. 4, 2011

(51) Int. Cl.
*G01S 7/40* (2006.01)

(52) U.S. Cl. ............... 342/21; 342/70; 342/91; 342/94; 342/174

(58) Field of Classification Search .............. 342/21, 342/70, 91, 94, 100–101, 173–174
See application file for complete search history.

(56) References Cited

U.S. PATENT DOCUMENTS

| | | | | | |
|---|---|---|---|---|---|
| 3,134,103 | A | * | 5/1964 | Flower | 342/109 |
| 3,796,990 | A | * | 3/1974 | Hill | 340/447 |
| 3,818,435 | A | * | 6/1974 | Hill et al. | 340/447 |
| 3,835,451 | A | * | 9/1974 | Church | 340/447 |
| 3,858,205 | A | * | 12/1974 | Ross | 342/21 |
| 4,156,875 | A | * | 5/1979 | Keane et al. | 342/62 |
| 4,264,880 | A | * | 4/1981 | Kawashima et al. | 332/109 |
| 4,618,967 | A | * | 10/1986 | Vance et al. | 375/324 |
| 7,369,598 | B2 | * | 5/2008 | Fontana et al. | 375/130 |
| 2006/0264192 | A1 | | 11/2006 | Kuo | |
| 2008/0129583 | A1 | * | 6/2008 | Larsson et al. | 342/124 |
| 2008/0191710 | A1 | | 8/2008 | Forstner | |
| 2008/0252546 | A1 | * | 10/2008 | Mohamadi | 343/853 |
| 2010/0265121 | A1 | * | 10/2010 | Bandhauer et al. | 342/135 |
| 2011/0187587 | A1 | * | 8/2011 | Knapp et al. | 342/202 |

FOREIGN PATENT DOCUMENTS

| | | | |
|---|---|---|---|
| DE | 2712868 A | * | 9/1978 |
| FR | 2634902 A | * | 2/1990 |
| JP | 61014583 A | * | 1/1986 |
| JP | 61071373 A | * | 4/1986 |
| KR | 906712 B1 | * | 7/2009 |

OTHER PUBLICATIONS

Bock et al., "3.3 ps SiGe Bipolar Technology", © 2004, 4 pages, Infineon Technologies.

* cited by examiner

*Primary Examiner* — John B Sotomayor
(74) *Attorney, Agent, or Firm* — Patterson Thuente Christensen Pedersen, P.A.

(57) ABSTRACT

Embodiments relate to apparatuses, systems and methods for testing high-frequency receivers. In an embodiment, a method includes integrating a pulse train generator and a receiver in an integrated circuit; generating a pulse train by the pulse train generator and applying the pulse train to an input of the receiver; measuring at least one property of the pulse train; and determining at least one characteristic of the receiver using the at least one property of the pulse train. In an embodiment, an integrated circuit includes a receiver, and a pulse train generator configured to generate a pulse train and apply the pulse train to an input of the receiver, wherein at least one characteristic of the receiver can be determined using at least one measured property of the pulse train.

18 Claims, 7 Drawing Sheets

RECEIVER TEST CIRCUITS, SYSTEMS AND METHODS

TECHNICAL FIELD

The invention relates generally to receiver circuitry and more particularly to the testing of high-frequency receiver circuitry after production and in situ.

BACKGROUND

Conventionally, integrated millimeter-wave receivers, such as those used in automotive radar at 77 GHz, are tested either after production using expensive probe stations and measurement equipment or only indirectly via other measurements at low frequencies. The former is costly and time inefficient, while the latter provides only a general indication of circuit performance rather than an oft-desired thorough characterization.

While the integration of test signal sources on chip has been proposed, such a solution can be imperfect because the properties of the test signal vary with process variations and are not known exactly. Therefore, it can be difficult to obtain precise measurements, and a need for accurate and cost-effective testing remains.

SUMMARY OF THE INVENTION

Embodiments relate to apparatuses, systems and methods for testing high-frequency receivers. In an embodiment, a method comprises integrating a pulse train generator and a receiver in an integrated circuit; generating a pulse train by the pulse train generator and applying the pulse train to an input of the receiver; measuring at least one property of the pulse train; and determining at least one characteristic of the receiver using the at least one property of the pulse train.

In an embodiment, an integrated circuit comprises a receiver, and a pulse train generator configured to generate a pulse train and apply the pulse train to an input of the receiver, wherein at least one characteristic of the receiver can be determined using at least one measured property of the pulse train.

In an embodiment, a system comprises an integrated circuit comprising a receiver, and a pulse train generator comprising an inverter chain having a gate delay, wherein the pulse train generator is configured to generate a pulse train and apply the pulse train to an input of the receiver and an input of a low pass filter, wherein an average voltage of the pulse train is measurable at an output of the low pass filter; and a baseband processor couplable to an output of the receiver to receive an output signal from the receiver and configured to determine a characteristic of the receiver based on the output signal, the average voltage and the gate delay.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to test signal generators and methods for testing high frequency receivers. The test signal generator circuit and the receiver to be tested can be integrated on the same integrated circuit. In an embodiment, the circuit is intended for testing receivers after production, such as in frontend and/or backend test, as well as in the application. A goal is to provide accurate testing of receiver performance at low cost and without the need for expensive test equipment. This is especially pertinent to receivers in the millimeter wave range (e.g., for automotive radar applications that operate at 77 GHz), for which conventional testing requires significant effort. While the examples herein will generally be discussed in the context of radar applications, such as automotive, operating at 77 GHz, other frequencies and/or applications can be used in various embodiments.

The invention addresses the problems related to testing integrated receivers by generating a well-defined test signal on chip. The test signal is generated by a pulse train generator integrated with the receiver in an integrated circuit in an embodiment. The test signal is applied to a receiver input, such as in production testing or in the receiver application in situ, and provides a characterization of receiver performance, such as gain, noise figure and frequency response, with improved accuracy in embodiments. In one embodiment, the test signal comprises a pulse train with low duty cycle that contains harmonics up to the millimeter wave range.

Figure 1:
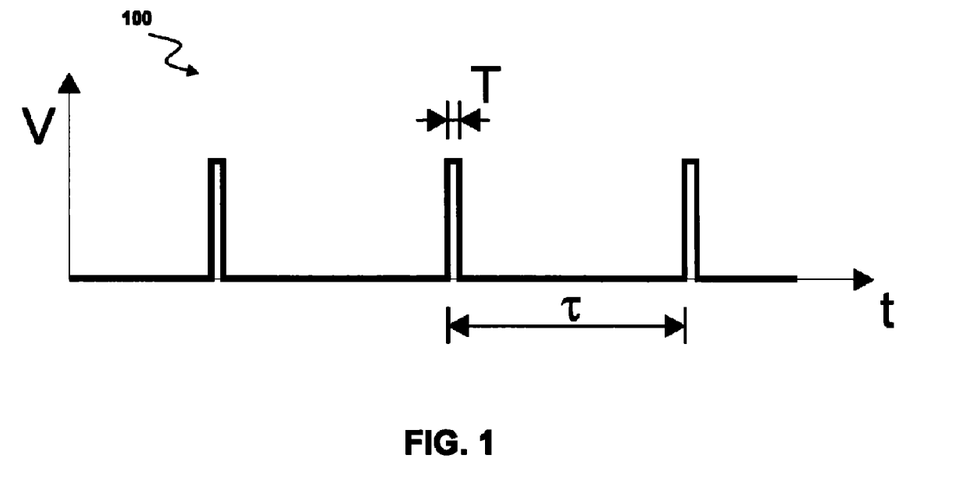
FIG. 1 is a diagram of a pulse train according to an embodiment.

FIG. 1 depicts an example pulse train 100 with period τ and pulse duration T. To obtain precise measurements, it is desired to know the exact value of T.

Figure 2:
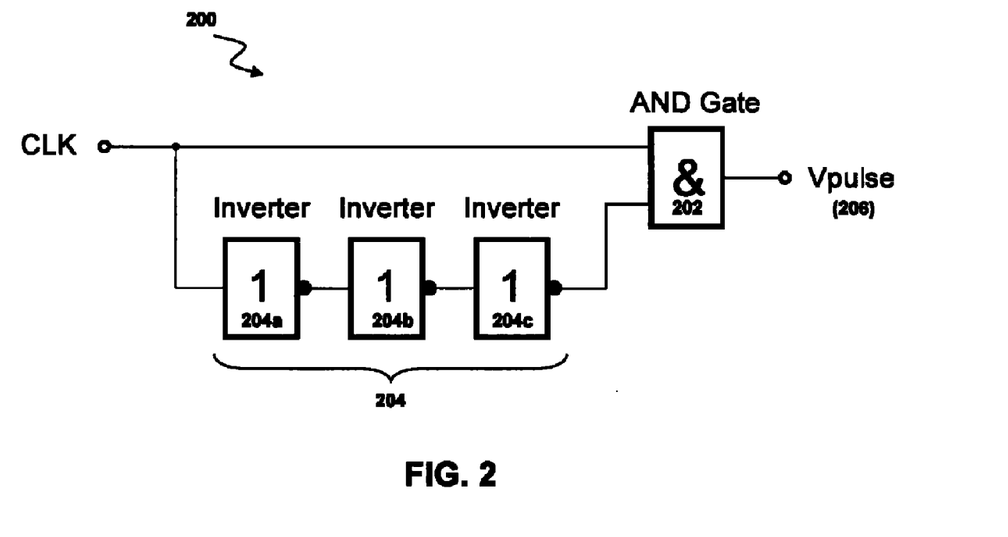
FIG. 2 is a block diagram of a circuit according to an embodiment.

FIG. 2 depicts an embodiment of a circuit 200 for generating pulse train 100. A clock signal CLK is applied to a first input of an AND gate 202. Clock signal CLK is also applied to an inverter chain 204 comprising three inverters 204a, 204b, 204c. Each inverter 204a-c delays clock signal CLK by a small amount of time, corresponding to the gate delay of the respective inverter 204a-c. The delayed clock signal CLK is then applied to the second input of AND gate 202 that generates the pulse train $V_{pulse}$ 206, with the pulse duration T (FIG. 1) of $V_{pulse}$ 206 determined by the overall gate delay of inverter chain 204.

The gate delay is an important figure of merit in semiconductor technologies. Therefore, ring oscillators are usually part of the Process Control Monitoring (PCM) structures that are included on every manufactured wafer because ring oscillators include an inverter chain that allows the gate delay to be measured. PCM structures typically are placed at several different locations on each wafer. Ring oscillator gate delay measurements show only very little variation across the wafer, as is discussed, for example, in Boeck et al., 3.3 *ps SiGe Bipolar Technology*, IEEE (2004), which is incorporated herein by reference in its entirety. Therefore, the gate delay measured at these existing PCM structures provides accurate information about the pulse duration T of circuit 200.

Figure 3:
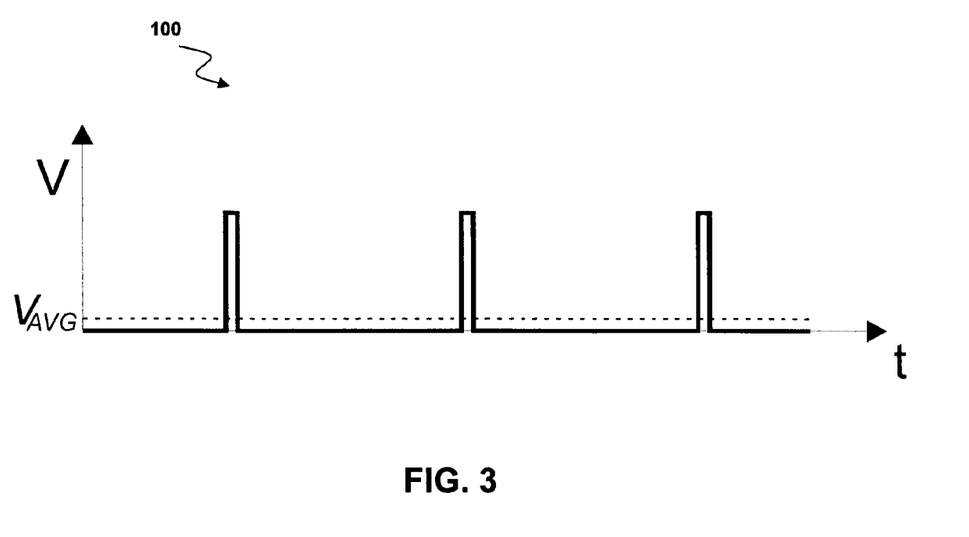
FIG. 3 is a diagram of a pulse train according to an embodiment.

Referring to FIG. 3, when the pulse duration T and period t of signal 100 are known it is possible to obtain information about the pulse amplitude by measuring the average voltage $V_{AVG}$ of the pulse train 100. Average voltage $V_{AVG}$ can be derived by low-pass filtering pulse train 100. Once pulse duration T and average voltage $V_{AVG}$ are known, the resulting amplitude of the test signal 100 is also known, thereby providing for precise receiver characterization.

Figure 4:
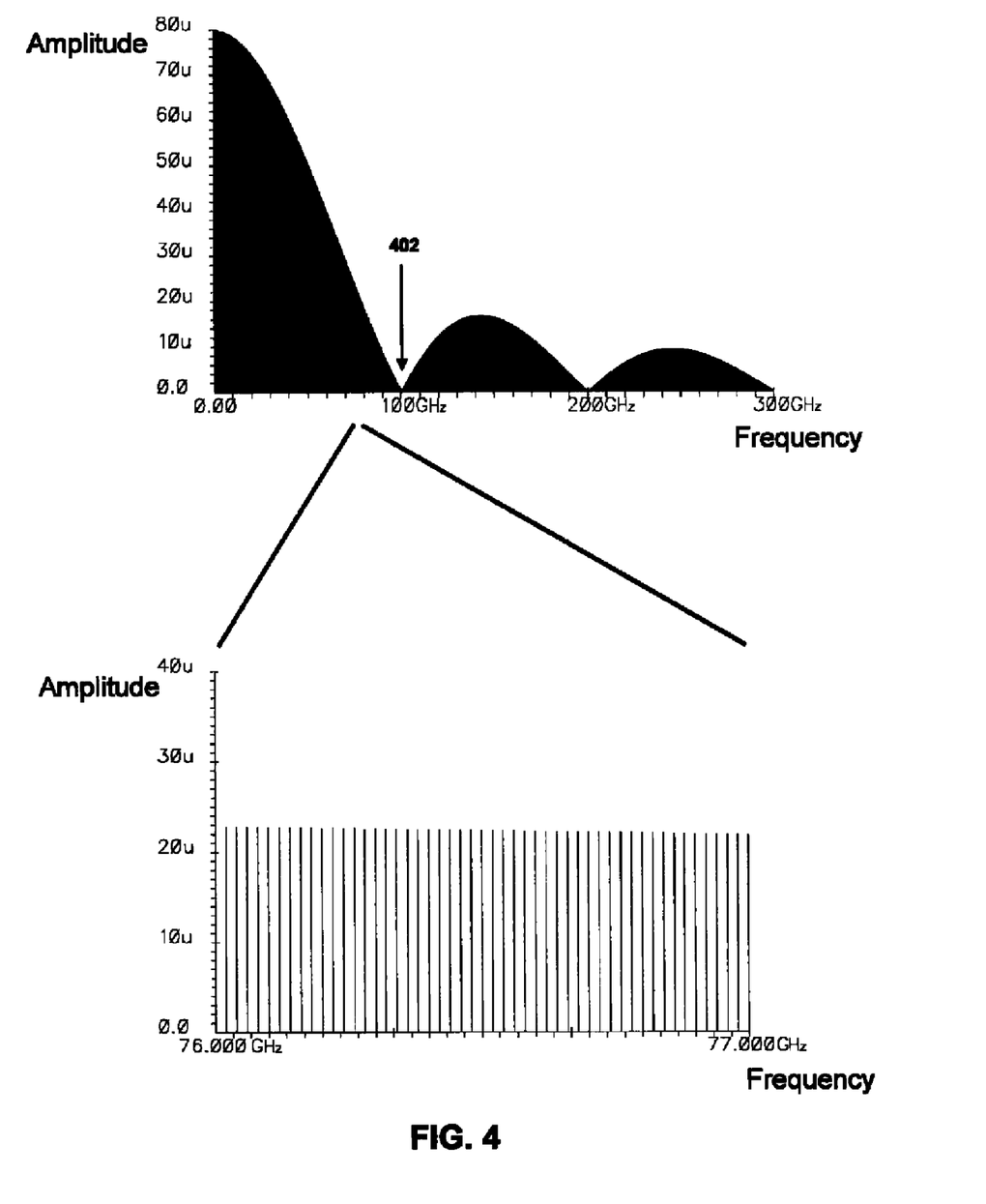
FIG. 4 is a pulse train spectrum graph according to an embodiment.

The envelope of the spectrum of a pulse train corresponds to a sin(x)/x function, and the amplitude of the spectral lines reaches a first null at a frequency of 1/T. State-of-the-art semiconductor processes typically achieve gate delays below 4 picoseconds (ps). Therefore, referring to FIG. 4, it is possible to generate pulses of sufficiently short duration to have the first null 402 at frequencies of 100 GHz or greater. This means that spectral lines of sufficient amplitude are available in the automotive radar band at 77 GHz. The bottom portion of FIG. 4 illustrates this point in a zoomed-in section of the spectrum around 77 GHz.

Figure 5:
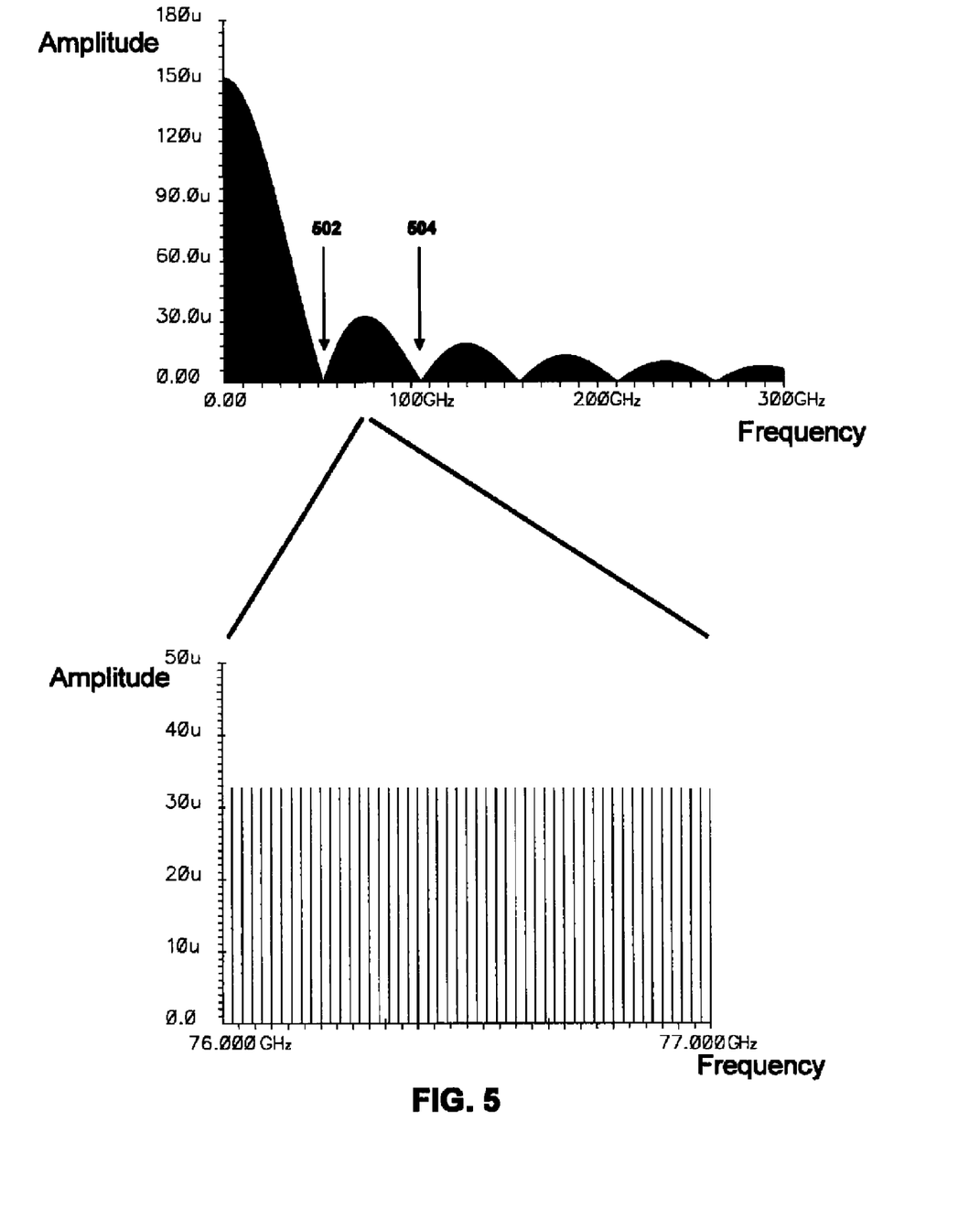
FIG. 5 is a pulse train spectrum graph according to an embodiment.

Alternatively, it is possible to use wider pulses, such that the operating frequency of the device under test lies between the first and second nulls 502, 504 as shown in FIG. 5. Although the first null 502 is below the desired operating frequency of 77 GHz, the spectrum remains sufficient in the range of 77 GHz, which can be seen in the bottom portion of FIG. 5. In fact, the spectrum is somewhat flat at 77 GHz and does not have significant variation, which is preferred in testing.

Figure 6:
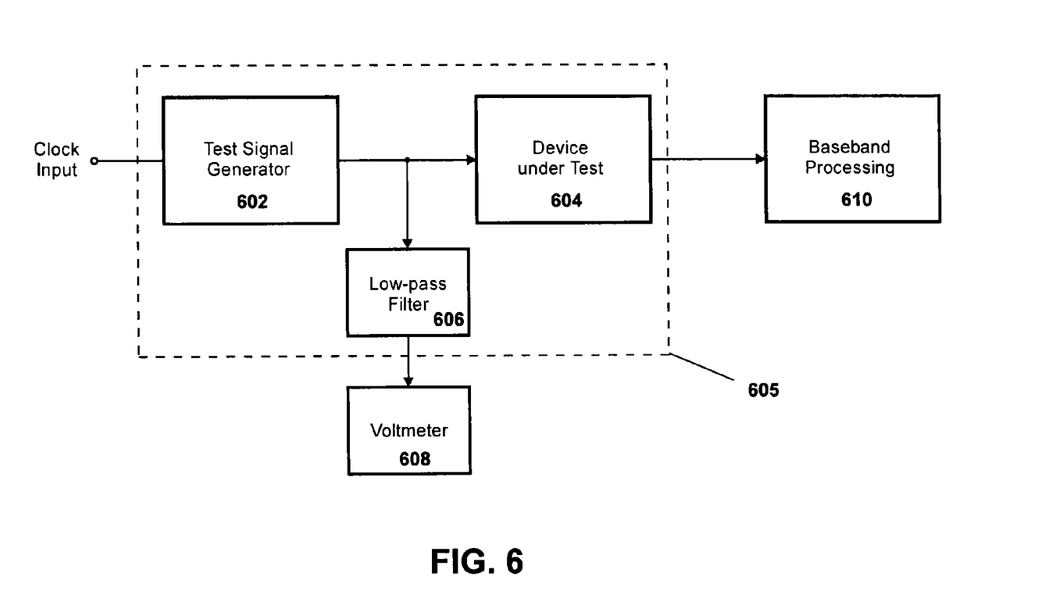
FIG. 6 is a block diagram of a test configuration according to an embodiment.

FIG. 6 depicts an example implementation of an embodiment. A test signal generator 602 is integrated together with the receiver depicted here as device under test 604 in an integrated circuit (IC) 605. In an embodiment, test signal generator 602 is implemented as circuit 200 depicted in FIG. 2. A test signal is applied to the input of receiver (device under test) 604 and to a low-pass filter 606. At the output of filter 606, the average voltage of the pulse train can be measured by a voltmeter 608. A baseband processing unit 610 is implemented in embodiments to characterize the output signal of device under test 604. Gain and noise figures of device under test 604 can be determined accurately because the characteristics of the test signal originating from test signal generator 602 are known precisely from measurements of the average voltage $V_{AVG}$ by voltmeter 608 and gate delay as described above.

Figure 7:
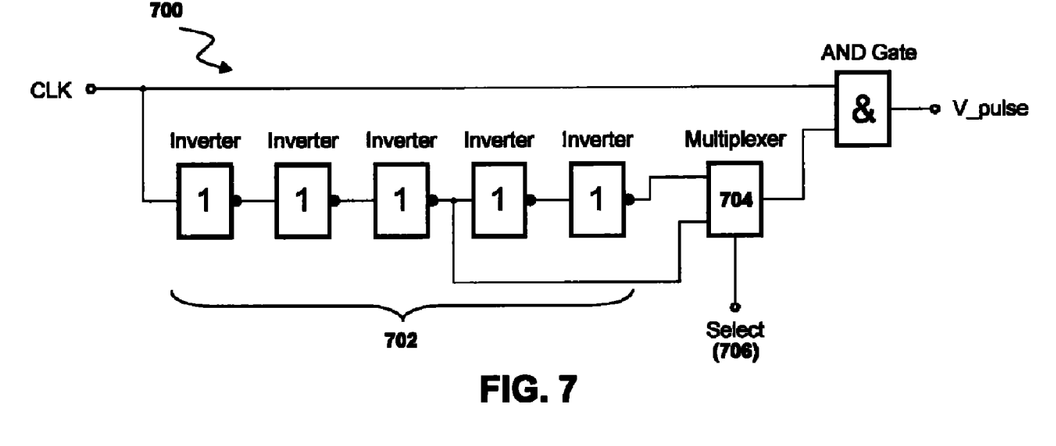
FIG. 7 is a block diagram of a circuit according to an embodiment.

FIG. 7 depicts an embodiment of a test signal generator 700 with a selectable number of inverter stages 702. A multiplexer 704 is added to inverter chain 702. Depending on the state of a select signal 706, a different number of inverter stages, three or five in the embodiment depicted, is used. This allows for varying the pulse duration T and therefore the frequency characteristics of the test signal, similar to the embodiments of FIGS. 4 and 5.

Figure 8:
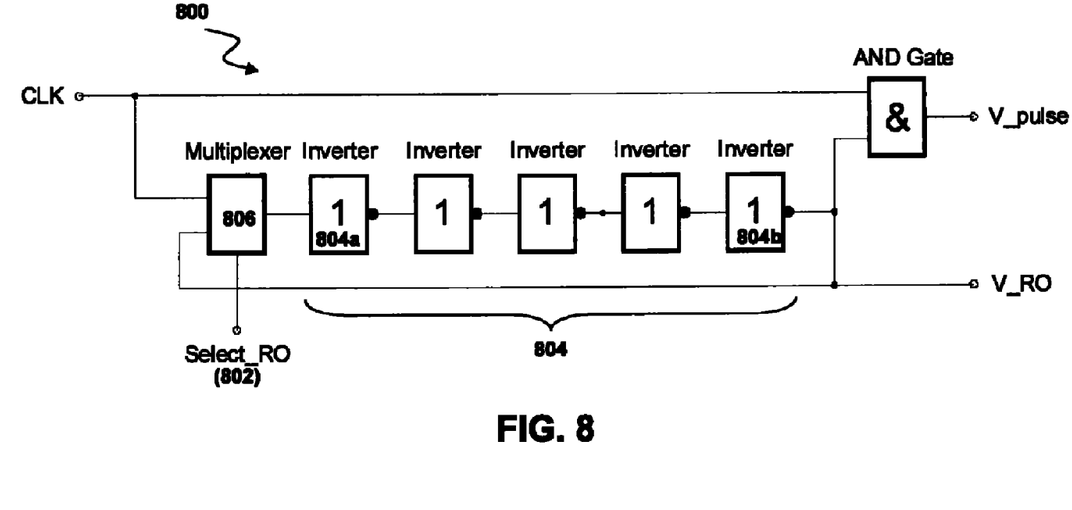
FIG. 8 is a block diagram of a circuit according to an embodiment.
Figure 9:
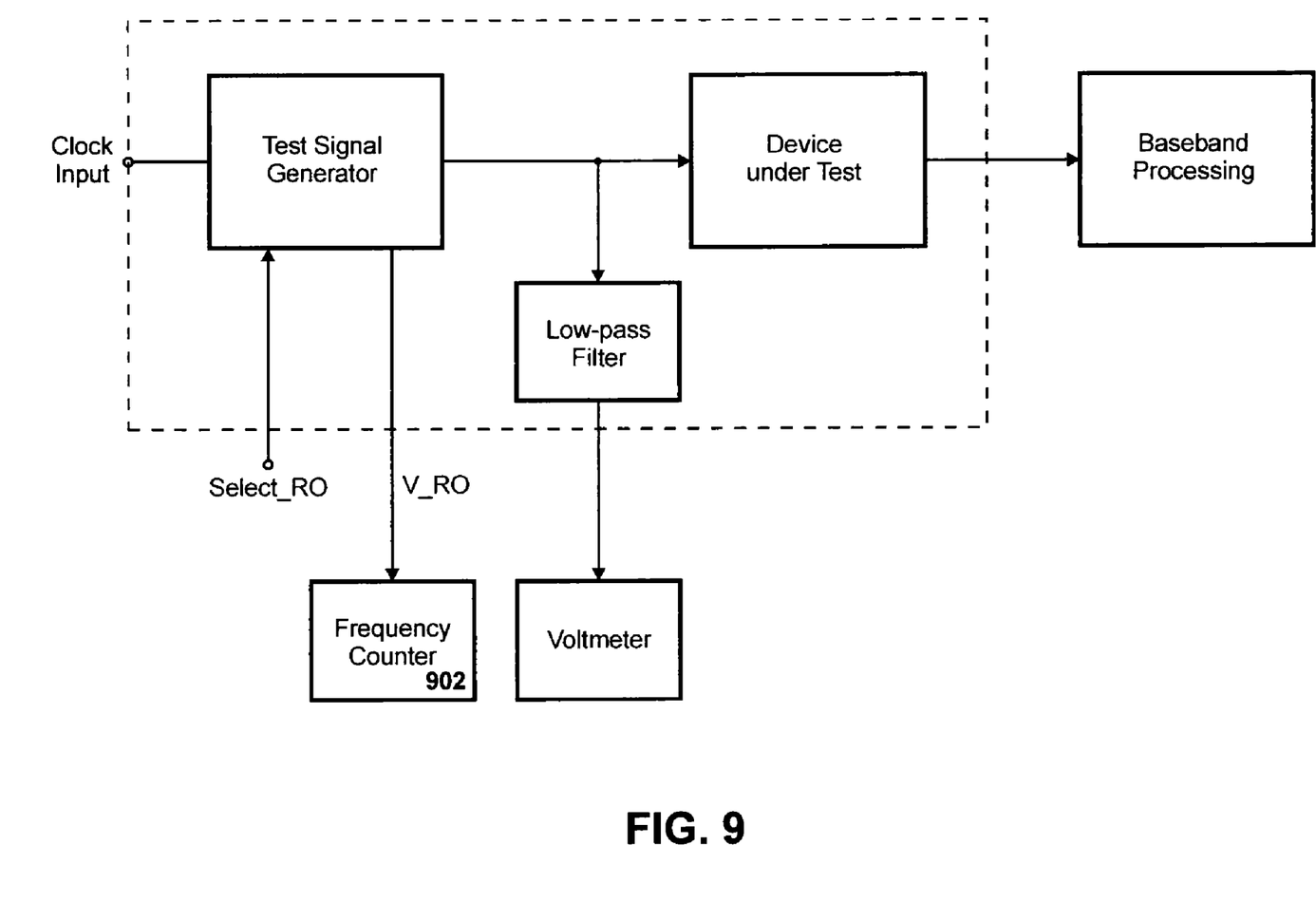
FIG. 9 is a block diagram of a test configuration according to an embodiment.

FIGS. 8 and 9 depict an embodiment in which the value of the gate delay, and thereby the pulse duration T, is not derived from measurements of PCM structures but individually for each device under test. This leads to a further increase in measurement accuracy and allows for receiver testing even if no PCM data are available.

FIG. 8 shows how the gate delay of the inverter stages in pulse train generator 800 can be measured. Depending on the Select_RO signal 802, the input of the first inverter stage 804a of inverter chain 804 is either connected to the clock signal CLK or to the output of the last inverter stage 804b, via multiplexer 806. When the output of the last stage 804b is used as input, inverter chain 804 functions as a ring oscillator. The output signal of the ring oscillator (inverter chain 804) is available at V_RO, and the gate delay can be determined by measuring the frequency of the signal at V_RO by a frequency counter 902 as depicted in FIG. 9. When multiplexer 806 applies clock signal CLK to the input of inverter chain 804, circuit 800 operates as a pulse train generator similar to circuit 200 of FIG. 2.

Embodiments thereby provide efficient and less expensive test implementations for high frequency receivers, including automotive and other radar receivers operating at 77 GHz, by integrating a test signal generator with the receiver in an integrated circuit. Characteristics of the signal generated by the test signal generator can be well-defined, in part through the use of existing on-wafer structures. Accurate testing can thereby be accomplished at reduced cost and complexity when compared to conventional high frequency receiver testing.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, implantation locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A method comprising:
    integrating a pulse train generator and a receiver in an integrated circuit;

generating a pulse train by the pulse train generator and applying the pulse train to an input of the receiver;

measuring at least one property of the pulse train by measuring an average voltage of the pulse train, measuring a gate delay of the pulse train generator to determine a pulse duration, measuring a pulse duration of the pulse train, or measuring a period of the pulse train; and determining at least one characteristic of the receiver using the at least one property of the pulse train.

2. The method of claim 1, wherein the receiver is a radar receiver.

3. The method of claim 2, wherein the receiver is a 77 GHz receiver.

4. The method of claim 1, wherein measuring an average voltage comprises low-pass filtering the pulse train.

5. The method of claim 1, wherein generating a pulse train comprises:
   applying a clock signal to a first input of an AND gate;
   applying the clock signal to a chain of a plurality of inverters to obtain a delayed clock signal;
   applying the delayed clock signal to a second input of the AND gate.

6. The method of claim 1, wherein determining at least one characteristic of the receiver comprises applying an output signal of the receiver to a baseband processing unit.

7. The method of claim 1, wherein determining at least one characteristic of the receiver comprises determining at least one of a gain characteristic or a noise characteristic of the receiver.

8. A method comprising:
   integrating a pulse train generator and a receiver in an integrated circuit;
   generating, by the pulse train generator, a pulse train in which a first null of a spectrum envelope occurs at a frequency higher than an operating frequency of the receiver and applying the pulse train to an input of the receiver;
   measuring at least one property of the pulse train; and
   determining at least one characteristic of the receiver using the at least one property of the pulse train.

9. A method comprising:
   integrating a pulse train generator and a receiver in an integrated circuit;
   generating, by the pulse train generator, a pulse train in which a first null of a spectrum envelope occurs at a frequency lower than an operating frequency of the receiver and applying the pulse train to an input of the receiver;
   measuring at least one property of the pulse train; and
   determining at least one characteristic of the receiver using the at least one property of the pulse train.

10. An integrated circuit comprising:
    a receiver; and
    a pulse train generator configured to generate a pulse train and apply the pulse train to an input of the receiver, wherein at least one characteristic of the receiver can be determined using at least one measured property of the pulse train, and wherein the pulse train generator comprises a plurality of inverter stages.

11. The integrated circuit of claim 10, wherein the receiver comprises a radar receiver.

12. The integrated circuit of claim 11, wherein the radar receiver comprises a 77 GHz receiver.

13. The integrated circuit of claim 10, wherein the pulse train generator comprises three inverter stages.

14. The integrated circuit of claim 10, further comprising a multiplexer.

15. The integrated circuit of claim 14, wherein a number of the plurality of inverter stages is selectable via the multiplexer.

16. The integrated circuit of claim 14, wherein an input of a first inverter of the plurality of inverter stages is selectably couplable to an output of a last inverter of the plurality of inverter stages such that the plurality of inverter stages form a ring oscillator.

17. A system comprising:
    an integrated circuit comprising
      a receiver, and
      a pulse train generator comprising an inverter chain having a gate delay, wherein the pulse train generator is configured to generate a pulse train and apply the pulse train to an input of the receiver and an input of a low pass filter, wherein an average voltage of the pulse train is measurable at an output of the low pass filter; and
    a baseband processor couplable to an output of the receiver to receive an output signal from the receiver and configured to determine a characteristic of the receiver based on the output signal, the average voltage and the gate delay.

18. The system of claim 17, wherein the receiver comprises a 77 GHz radar receiver.

* * * * *